(12) United States Patent
Teichmer

(10) Patent No.: US 6,380,991 B1
(45) Date of Patent: Apr. 30, 2002

(54) METHOD FOR SPLICING MPEG-2 TRANSPORT STREAMS

(75) Inventor: Daniel G. Teichmer, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/196,656

(22) Filed: Nov. 19, 1998

(51) Int. Cl.[7] .................................................. H04N 7/18
(52) U.S. Cl. ................ 348/845; 375/240.26; 348/845.1
(58) Field of Search ........................... 348/845.1–845.3, 348/461–468; 375/240.26–240.29

(56) References Cited

U.S. PATENT DOCUMENTS

| | | | | |
|---|---|---|---|---|
| 5,859,660 A | * | 1/1999 | Perkins et al. ................. | 348/9 |
| 6,141,358 A | * | 10/2000 | Hurst, Jr. et al. ........... | 370/543 |
| 6,181,383 B1 | * | 1/2001 | Fox et al. .................... | 348/515 |
| 6,252,873 B1 | * | 6/2001 | Vines ......................... | 370/389 |

* cited by examiner

*Primary Examiner*—Andy Rao
(74) *Attorney, Agent, or Firm*—Francis I. Gray

(57) ABSTRACT

A method for splicing video in MPEG-2 transport stream based on locally available data identifies a splice point in a first video stream at an anchor frame and a splice point in a second video stream subsequent in time at an anchor frame, the time difference between the splice points forming a time span. Inserting into the time span a drain frame sequence for nearly emptying the buffers in a decoder. The drain frame sequence may be a black I-frame followed by as many freeze B-frames as necessary that reference the black I-frame, or may be as many freeze B-frames as necessary that reference the last anchor frame prior to the splice point in the first video stream.

3 Claims, 2 Drawing Sheets

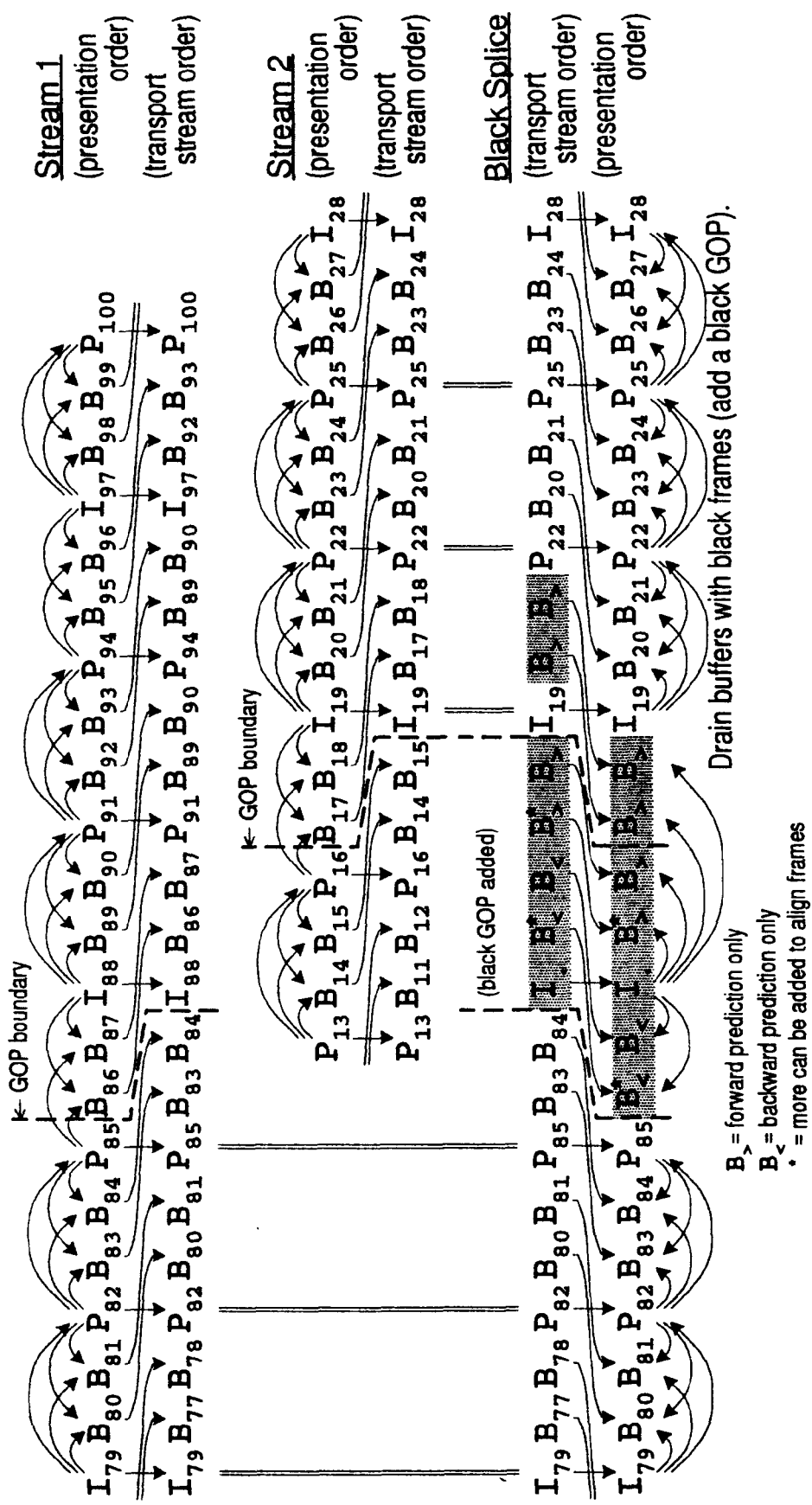
Fig. 1 — Black Splice

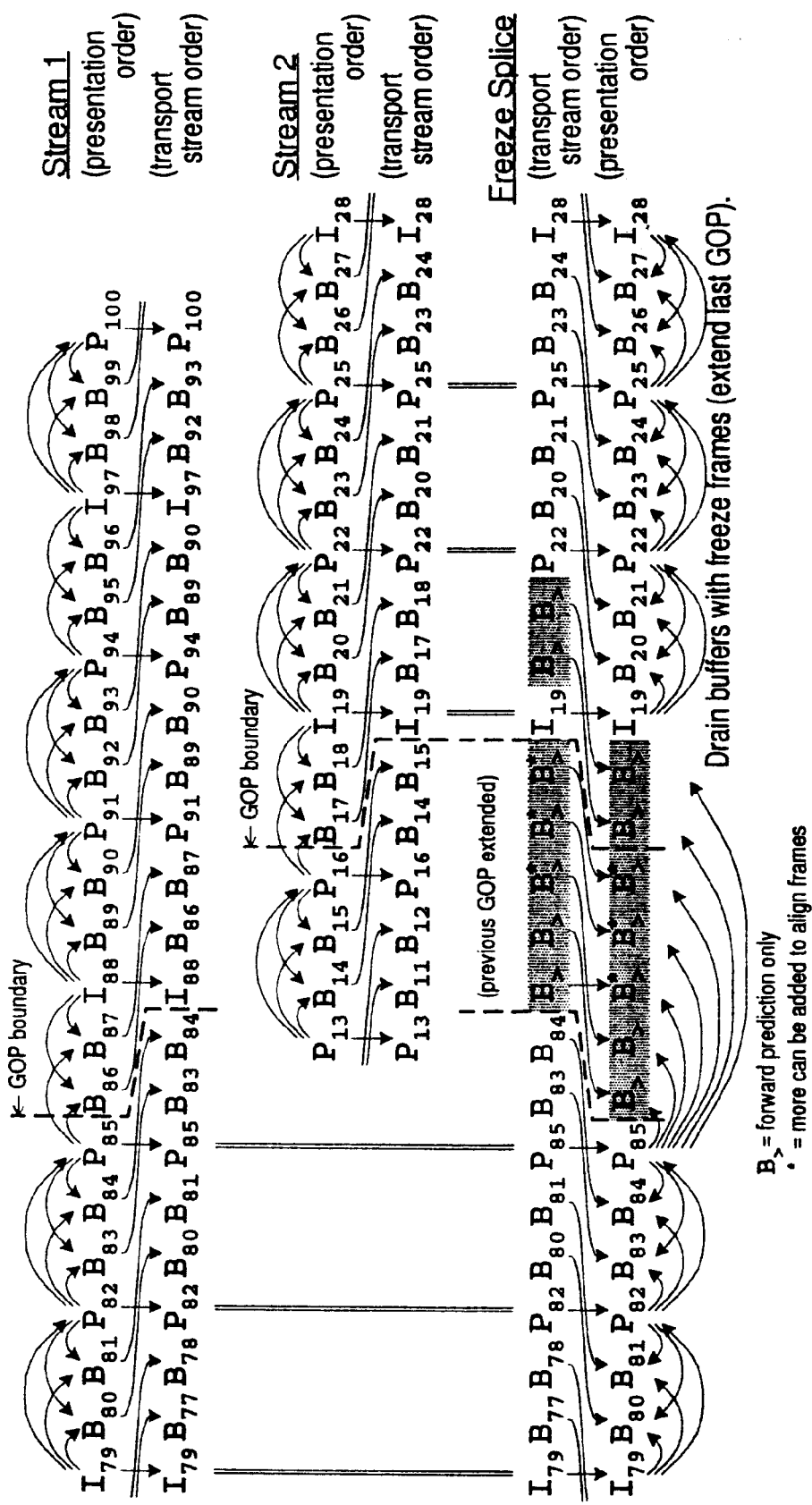
Fig. 2 — Freeze Splice

METHOD FOR SPLICING MPEG-2 TRANSPORT STREAMS

BACKGROUND OF THE INVENTION

The present invention relates to compressed video data processing, and more particularly to a method for splicing MPEG-2 transport streams based upon locally available data.

In order to transmit data over limited bandwidth media it is often necessary to compress the video data signal to reduce its bandwidth. One of the video compression standards is the ISO/IEC 11172-2 MPEG-2 standard. Under this standard, frames or pictures represented by the video data signal are compressed as groups of pictures (GOPs), with the initial picture compressed as an I-frame, i.e., an internally compressed frame, and the others as P- or B- frames, i.e., predicted or bidirectionally predicted based upon the motion of the image from picture to picture. One of the problems with compressed video with motion compensation, such as MPEG-2, is that of switching between video data streams, or splicing two video data streams in sequence. Switching at an arbitrary point in an MPEG-2 data stream could result in switching between predictive frames in the two data streams with the result that there is an interval during which the picture is garbled since the predictive frames are no longer associated with the proper anchor, or I-frames.

What is desired is a method of splicing video in MPEG-2 transport streams that provides a smooth transition from one vide stream to the other.

SUMMARY OF THE INVENTION

Accordingly the present invention provides a method for splicing video in MPEG-2 transport streams based on locally available data, without depending on splice countdowns, closed GOPs or other splice-related information provided by upstream equipment. A first splice point is identified in a first video stream at an anchor frame, and a second splice point subsequent in time is identified in a second video stream at an anchor frame, the difference in time between the splice points forming a time span. A drain frame sequence is inserted into the time span to nearly empty buffers in a decoder. The drain frame sequence may be a black group of pictures (GOP) that is as long as necessary to fill the time span, or an extension of the last GOP of the first video stream in the form of freeze frames.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is an illustrative view of a splice of two transport streams according to a first embodiment of the method according to the present invention.

FIG. 2 is an illustrative view of a splice of two transport streams according to a second embodiment of the method according to the present invention.

DETAILED DESCRIPTION OF THE INVENTION

Referring now to FIGS. 1 and 2 two video sequences are shown in presentation order and in transport stream (TS) order. The frames are numbered in presentation order, the order of the frames as they are presented on a display or as originated from a video camera. In MPEG encoded streams the frames are in TS order. This reordering places the anchor frames, I- or P-frames, ahead of the B-frames that reference them, reducing the buffer size needed in a standard MPEG decoder. The frame numbering shows the reordering of the streams before and after splicing. The numbering, 77 through 100 for Stream 1 and 11 through 28 for Stream 2, is arbitrary and is not indicating any specific time relationship between the two streams. The object is to create a spliced MPEG stream that switches from Stream 1 to Stream 2. The splice occurs starting at any anchor frame of Stream 2 where the old video stream stops, such as at P85, and ends at an I-frame in Stream 2 where the new video stream resumes, such as at I19. The time span between these two splice points may be an arbitrary number of frames.

The time span between the splice points for the two video streams is filled with a sequence of drain frames. The drain frame sequence forces the buffers of a decoder into a nearly empty state so that there is room for the I-frame of the new video stream, stream two, regardless of its content. The number of frames required for this is format dependent.

The drain frames are frames that contain a minimal amount of data. These may be freeze frames that reference either the previous anchor frame or a black I-frame containing the minimum amount of data for an I-frame. The elementary stream content for the drain frame sequence may be prepared in advance based upon the video format. Drain frames may be added one-for-one, substituting an I-frame for an I-frame (once for the black I-frame for "black drain" or B-frame only for "freeze drain") in the first video stream, and B-frames for everything else until the next I-frame in the second video stream. The drain frames are inherently smaller than the frames for which they substitute.

As shown in FIG. 1 where a Black Splice is used, the drain frame sequence begins by substituting a black I-frame for I88 in the first video stream. Next in the drain frame sequence are two B-frames that substitute for B86 and B87 in the first video stream between I88 and the next anchor frame, referring to the TS order. These frames referenced a previous anchor frame in the first stream, but the substituted B-frames are freeze frames with minimum data content that reference the black I-frame in the drain frame sequence. After these two B-frames the drain frame sequence may contain an arbitrary number of freeze B-frames while waiting for the decoder buffers to drain, and while waiting for an I-frame in the second video stream, I19. The B-frames in the second video stream between I19 and the next anchor frame reference an earlier anchor frame, so these are also substituted with freeze frames, B17 and B18.

The Freeze Splice shown in FIG. 2 is identical to the Black Splice of FIG. 1 except that the drain sequence has no black I-frame, so the drain frame sequence displays a freeze of the last anchor frame, P85, in the first video stream prior to the splice instead of black. The Freeze Splice has less data, since it has not black I-frame, so it makes quicker splices than the Black Splice method.

This method may be used with multiprogram transport streams, but the elementary stream content for the drain frame sequences are independently multiplexed. Because the drain frames are smaller than those they replace, the drain frame sequences fit in the same packets allocated by upstream equipment, with null packets in the leftover space.

Thus the present invention provides a method of splicing video in MPEG-2 transport streams based on locally available data by filling the space between the last anchor frame of a first video stream and the first anchor frame of the second video stream at the splice point with a drain sequence that drains the buffers in a decoder so there is room for the I-frame of the second video stream after the splice point.

What is claimed is:

1. A method of splicing video in MPEG-2 transport streams comprising the steps of:

identifying a first splice point at an anchor frame in a first video stream;

identifying a second splice point at an anchor frame in a second video stream, the second splice point being later in time to produce a time span between the respective splice points; and inserting into the time span a drain frame sequence to force buffers in a decoder to a nearly empty state.

2. The method as recited in claim 1 wherein the drain frame sequence comprises a black I-frame followed by a plurality of freeze B-frames that reference the black I-frame.

3. The method as recited in claim 1 wherein the drain frame sequence comprises a plurality of freeze B-frames that reference a last anchor frame in the first video stream prior to the first splice point.

\* \* \* \* \*